(12) United States Patent
Han et al.

(10) Patent No.: US 10,011,760 B2
(45) Date of Patent: Jul. 3, 2018

(54) POLYMER-ENHANCED SURFACTANT FLOODING FOR PERMEABLE CARBONATES

(71) Applicant: Saudi Arabian Oil Company, Dhahran (SA)

(72) Inventors: Ming Han, Dhahran (SA); Ali Abdallah Al-Yousef, Dhahran (SA); Salah Hamad Al-Saleh, Dhahran (SA); Alhasan Fuseni, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 184 days.

(21) Appl. No.: 15/015,671

(22) Filed: Feb. 4, 2016

(65) Prior Publication Data

US 2016/0152886 A1 Jun. 2, 2016

Related U.S. Application Data

(62) Division of application No. 13/252,408, filed on Oct. 4, 2011, now Pat. No. 9,284,480.

(51) Int. Cl.
*E21B 43/00* (2006.01)
*C09K 8/584* (2006.01)
*C09K 8/588* (2006.01)

(52) U.S. Cl.
CPC .............. *C09K 8/588* (2013.01); *C09K 8/584* (2013.01)

(58) Field of Classification Search
CPC ........................................................ C09K 8/54
See application file for complete search history.

(56) References Cited

U.S. PATENT DOCUMENTS

| | | |
|---|---|---|
| 3,543,597 A | 12/1970 | De Schamphelaera et al. |
| 3,684,720 A | 8/1972 | Richardson |
| 4,004,638 A | 1/1977 | Burdyn et al. |
| 4,008,768 A | 2/1977 | Birk |
| 4,143,716 A | 3/1979 | Kalfoglou et al. |
| 4,353,806 A | 10/1982 | Canter et al. |
| 4,360,061 A | 11/1982 | Canter et al. |
| 4,421,168 A | 12/1983 | Hurd |
| 4,817,715 A | 4/1989 | Peru |
| 4,825,950 A | 5/1989 | Kalpakci et al. |
| 6,022,834 A | 2/2000 | Hsu et al. |

(Continued)

FOREIGN PATENT DOCUMENTS

| | | |
|---|---|---|
| CN | 101270279 | 9/2008 |
| CN | 101955448 A | 1/2011 |
| EP | 0668339 A1 | 8/1995 |
| WO | 2012125539 A1 | 9/2012 |

OTHER PUBLICATIONS

Alagic, E. and Skauge, A.; Combined Low Salinity Brine Injection and Surfactant Flooding in Mixed-Wet Sandstone Cores, Energy Fuels, Jun. 17, 2010, pp. 3551-3559, vol. 24, American Chemical Society, pubs.acs.org/EF.

(Continued)

*Primary Examiner* — William D Hutton, Jr.
*Assistant Examiner* — Avi T Skaist
(74) *Attorney, Agent, or Firm* — Bracewell LLP; Constance Gall Rhebergen (57) ABSTRACT

A method for increasing oil production in a carbonate reservoir by incorporating a saline solution injection including a saline soluble surfactant and a saline soluble polymer. The method provides for increased oil production as compared to conventional waterflooding techniques.

7 Claims, 4 Drawing Sheets

(56) References Cited

U.S. PATENT DOCUMENTS

| | | |
|---|---|---|
| 6,613,720 B1 | 9/2003 | Feraud et al. |
| 6,719,053 B2 | 4/2004 | Thompson |
| 7,556,098 B2 | 7/2009 | Berger et al. |
| 7,691,260 B2 | 4/2010 | Caneba |
| 8,550,163 B2 | 10/2013 | Al-Yousef et al. |
| 8,550,164 B2 | 10/2013 | Al-Yousef et al. |
| 2005/0137114 A1 | 6/2005 | Gatlin et al. |
| 2008/0035339 A1 | 2/2008 | Welton et al. |
| 2008/0302531 A1 | 12/2008 | Berget et al. |
| 2009/0111716 A1 | 4/2009 | Hough et al. |
| 2009/0111717 A1 | 4/2009 | Campbell et al. |
| 2009/0298719 A1 | 12/2009 | Le et al. |
| 2010/0029880 A1 | 2/2010 | Zhang et al. |
| 2010/0051268 A1 | 3/2010 | Tsuruta et al. |
| 2010/0282467 A1 | 11/2010 | Hutchinson et al. |

OTHER PUBLICATIONS

Babadagli, T., et al., "A Laboratory Feasibility Study of Dilute Surfactant Injection for the Yibal Field, Oman" Journal of Petroleum Science & Engineering: Apr. 27, 2005; 37-52; 48; Elsevier B.V.

Demin, W., et al., "Summary of ASP Pilots of Daqing Oil Field" Society of Petroleum Engineers, Inc., SPE 57288; This paper was presented for presentation at the 1999 SPE Asia Pacific Improved Oil Recovery Conf held in Kuala Lumpur, Malaysia Oct. 25-26, 1999.

Gupta, R. et al. , "Temperature Effects on Surfactant-Aided Imbibition Into Fractured Carbonates" Society of Petro Engineers, Inc. SPE 110204; presented at the 2007 SPE Annual Technical Conf and Exhibition held in Anaheim CA, USA; Nov. 11-14, 2007.

Maldal, T., et al. "Evaluation and Economical Feasibility of Polymer-Assisted Surfactant Flooding for the Gullfaks Field, Norway" Society of Petro Engineers, Inc., SPE 35378; Presented at the 1996 SPE/DOE Improved Oil Recovery Symposium, Tulsa, OK.

International Search Report with Written Opinion issued in related PCT Application PCT/US2012/058627; dated May 6, 2013; 17 pages.

Putz, A., et al., "A Field Test of Microemulsion Flooding, Chateaurenard Field, France" Society of Petroleum Engineers, Inc., of AIME; Apr. 1981; 710-718; 33(4).

First Examination Report issued in related European Patent Application 12-824-936.4-1354; dated Jun. 24, 2015; 8 pages.

Second Examination Report issued in related European Patent Application 12-824-936.4-1354; dated Feb. 17, 2016; 5 pages.

POLYMER-ENHANCED SURFACTANT FLOODING FOR PERMEABLE CARBONATES

RELATED APPLICATION

This application is a divisional application of U.S. patent application Ser. No. 13/252,408, filed on Oct. 4, 2011, which is incorporated herein by reference in its entirety.

TECHNICAL FIELD OF THE INVENTION

The present invention relates to a process for improving oil recovery in carbonate reservoirs. More specifically, embodiments of the present invention utilize polymer-enhanced surfactant flooding for permeable carbonates under harsh reservoir conditions.

BACKGROUND OF THE INVENTION

The petroleum industry has recognized for decades that only a portion of original oil in place (OOIP) in oil-bearing reservoirs is produced by natural mechanisms. It is also well-known that conventional methods of supplementing natural recovery are relatively inefficient. Typically, a reservoir may retain half of its original oil in place even after the application of currently available methods of secondary recovery. Accordingly, there is a continuing need in improving recovery methods, which will substantially increase the ultimate petroleum recovery of subterranean reservoirs.

Waterflooding

Waterflooding is a method of secondary recovery in which water is injected into a reservoir formation to displace mobile oil within the reservoir formation. The water from injection wells physically sweeps the displaced oil to adjacent production wells, so that the oil can be collected from the production wells. Generally, the water used in a waterflooding process is taken from nearby water sources, which is usually either seawater or produced water.

Surfactant Flooding

It is known to add aqueous surfactants to injection water in order to lower the oil-water interfacial tension and/or alter the wettability characteristics of reservoir rocks. However, the previously known methods involved the injection of an aqueous surfactant solution in high surfactant concentration known as micellar or microemulsion flooding. The objective was to displace residual oil and water miscible by a mutually soluble solvent using an injected slug of micellar solution (containing a mixture of a surfactant, a co-surfactant, brine and oil), so that an oil bank was formed in the subterranean formation before its production started. This art is commonly used in tertiary recovery mode with a high surfactant concentration of 1 wt % to 10 wt % (10,000 ppm to 100,000 ppm).

The high costs associated with classical surfactant flooding techniques described above have inhibited the implementation of this technique, particularly in harsh environments. Non-limiting examples of harsh environments include reservoirs with high reservoir temperatures, high brine salinities, and fractured carbonate. As a consequence, research into surfactant flooding has been focused on using dilute surfactant solutions in an attempt to reduce costs.

The use of high salinity water, particularly at elevated temperatures, presents a major challenge for dilute surfactant flooding. For example, high salinity causes low efficiency of surfactants in several ways, including high interfacial tension between the dilute surfactant solution and crude oil, high adsorption onto the reservoir rock surface, and precipitation of the surfactant.

Therefore, it would be desirable to have an improved process for waterflooding carbonate reservoirs under harsh reservoir conditions. Preferably, it would be desirable to have a process that produces oil in both macro-structure and micro-structure of reservoir rock. Preferably, it would be desirable to have a process that uses chemicals with greater long-term stability. Additionally, it would be beneficial if the process for an improved waterflooding could be implemented with existing infrastructure.

SUMMARY OF THE INVENTION

The present invention is directed to a process that satisfies at least one of these needs. In one embodiment, the process for recovering hydrocarbons in carbonate reservoirs includes the steps of introducing a first saline solution into the carbonate reservoir, recovering an amount of hydrocarbon from the carbonate reservoir, introducing a second saline solution into the carbonate reservoir, and recovering a second amount of hydrocarbon from the carbonate reservoir. The first saline solution includes water, salt, and an absence of a surfactant. The second saline solution includes water, salt, a saline soluble surfactant, and a saline soluble polymer. Further, the second saline solution has a salt concentration in a range of about 35,000-80,000 ppm. In one embodiment, the second saline solution is injected as a slug from 0.3 to 1 pore volume, followed by the injection of the first saline solution.

In one embodiment, the saline soluble surfactant is a betaine type surfactant with a concentration range from about 0.1 weight percent to about 0.5 weight percent. In another embodiment, the saline soluble polymer includes sulfonated polyacrylamides with a concentration range from about 0.1 weight percent to about 0.3 weight percent and/or xanthan gum without a pyruvylate group and a concentration range from about 0.1 weight percent to about 0.3 weight percent.

In one embodiment, the composition for recovering hydrocarbons in carbonate reservoirs includes a betaine type surfactant with a concentration range from about 0.1 weight percent to about 0.5 weight percent and sulfonated polyacrylamides with a concentration range from about 0.1 weight percent to about 0.3 weight percent and/or xanthan gum without a pyruvylate group and a concentration range from about 0.1 weight percent to about 0.3 weight percent.

In one embodiment, the betaine type surfactant is sulfonated betaine or carboxylated betaine. In one embodiment, the betaine type surfactant includes a carboxylated betaine with ethylene glycol mono butyl ether as a co-surfactant. In another embodiment, the saline soluble polymer is a sulfonated polymer with a sulfonation degree from about 5% to about 32%. In one embodiment, the sulfonated polymer is a sulfonated polyacrylamide with a sulfonation degree of about 25%, a molecular weight of about $10 \times 10^6$ Daltons, a hydrolysis degree of about 25%, and an effective solid content of about 88%.

In one embodiment, the betaine type surfactant has a concentration of about 0.2 percent weight and the saline soluble polymer has a concentration of about 0.2 percent weight. In another embodiment, the second saline solution has a density of about 1.008 g/cm$^3$ and a viscosity of about 4.13 centipoise at about 95° C.

In one embodiment, the carbonate reservoir includes at least two pore structures with a permeability of about 100 to about 2000 millidarcy. In another embodiment, an interfacial tension between the second saline solution and crude oil of the carbonate reservoir is in a range of about $10^{-2} \sim 10^{-3}$ dynes/centimeter under reservoir temperature.

In one embodiment, the second saline solution has a viscosity in a range of about 2-5 centipoise under the reservoir temperature. In another embodiment, adsorption of reservoir rock of the second saline solution is in a range of about 1.0 grams/kilogram ~1.5 grams/kilogram when exposed to harsh temperature and salinity conditions of the carbonate reservoir.

In one embodiment, the second saline solution has an absence of alkali.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

While the invention will be described in connection with several embodiments, it will be understood that it is not intended to limit the invention to those embodiments. On the contrary, it is intended to cover all the alternatives, modifications and equivalence as may be included within the spirit and scope of the invention defined by the appended claims.

In one embodiment, the process for improving tertiary hydrocarbon recovery in carbonate reservoirs includes the steps of introducing a first saline solution into the carbonate reservoir, recovering an amount of hydrocarbon from the carbonate reservoir, introducing a second saline solution into the carbonate reservoir, and recovering a second amount of hydrocarbon from the carbonate reservoir. The first saline solution includes water, salt, and an absence of a surfactant. The second saline solution includes water, salt, a saline soluble surfactant, and a saline soluble polymer. Further, the second saline solution has a salt concentration of about 35,000-80,000 ppm. A slug of second saline solution is followed by regular waterflooding using the first saline solution.

More specifically, in addition to using a saline soluble surfactant for releasing oil, a saline soluble polymer is also used to more efficiently sweep in the micro-structure of reservoir rock. The saline soluble polymer enhances recovery by (1) increasing the viscosity of the injectant in the macrostructure of reservoir rock and (2) improving the injectant's ability to enter the microstructure of reservoir rock where residual oil is found. Reservoir conditions such as temperature, salinity, and rock surface properties (e.g., surface charge, electrostatic) can inhibit the application of chemical slugs because high temperatures can affect the long term stability of the chemicals. Further, high salinity can cause precipitation issues, and the rock surface properties can cause significant adsorption on the rock surfaces. The following studies were performed to identify preferred saline soluble polymers and preferred saline soluble surfactant that addresses these issues.

The present invention is illustrated by the following examples, which are presented for illustrative purposes, only, and are not intended as limiting the scope of the invention which is defined by the appended claims.

EXAMPLE 1

Screening Study

A polymer screening study was performed to select potential saline soluble polymers for recovering hydrocarbons, where the polymer screening study included a compatibility test with various brines (e.g., whether the polymer precipitates or does not dissolve completely in brine) such as seawater and produced waters. If a polymer degraded at reservoir condition, the polymer was eliminated from the polymer screening study. Sulfonated polyacrylamides and xanthan gum were initially selected for further testing as discussed below because they are not sensitive (i.e., minimal precipitation of the polymer is observed) to the various brines occurring in the reservoir. In other words, saline soluble polymers that are sensitive to brine (i.e., showing a dramatic change in viscosity between brines) were eliminated from the polymer screening study.

The polymer screening study also considered the long-term stability of the saline soluble polymer at high salinity and high temperature. It has been reported that polyacrylamide type polymers can survive at a temperature of 93° C. in low salinity, while a biopolymer like xanthan can be used at 70° C. in high salinity. In the polymer screening study, both sulfonated polyacrylamides and xanthan gum exhibited good viscosity retention at 95° C. for at least 6 months.

A surfactant screening study was also performed to select potential surfactants for recovering hydrocarbons. In compatibility tests, saline soluble surfactants that generally dissolved in various brines and remained in solution under harsh conditions were selected. In other words, saline soluble surfactants were selected based on their ability to maintain an operable amount of surfactant under harsh reservoir conditions. For example, a betaine type surfactant was initially selected for further testing as discussed below because the surfactant screening study revealed that the betaine type surfactant's interfacial tension changed from the $10^{-3}$ mN/m range to the $10^{-2}$ mN/m range at 95° C. over a period of 60 days, which is well within the region of good residual mobilization.

In addition, the surfactants selected in the surfactant screening study do not include alkali in order to avoid precipitation caused when alkali is mixed with field brine. Further, the saline soluble surfactants, when excluding alkali, present good performance in terms of interfacial tension reduction, adsorption on the rock, as well as the oil recovery potential as shown in the coreflooding test below.

EXAMPLE 2

Coreflooding Test

A coreflooding study was conducted to demonstrate the use of the selected polymers and surfactants. The experimental parameters and procedures were designed to reflect the initial conditions of a carbonate reservoir in the Middle East, as well as the current field injection practices.

Core Plug

The core material for the coreflooding study was selected from a carbonate reservoir in the Middle East. Specifically, core plugs (1 inch in diameter, and 1.5 inch in length) were cut from whole cores, and composite cores were also selected for coreflood experiments. Table I shows the petrophysical properties of the selected cores. The average porosity and liquid permeability are approximately 22% and 416 millidarcies (md), respectively. The predominant mineral in the selected carbonate cores is calcite (more than 90 weight %), and other minerals include dolomite (trace amounts up to 9%) and a minor amount (<1 wt %) of quartz.

TABLE I

Basic Petrophysical Properties for Core Plugs

| Sample # | Length, cm | Diameter, cm | Porosity, % | Permeability, md | Pore Volume, cm³ | $S_{wi}$, % |
|---|---|---|---|---|---|---|
| 63 | 3.598 | 3.845 | 24.7 | 233.7 | 9.51 | 17.78 |
| 145 | 3.449 | 3.798 | 24.6 | 468.1 | 8.89 | 12.98 |
| 155 | 3.892 | 3.800 | 19.2 | 344.8 | 8.19 | 18.10 |
| 210 | 4.413 | 3.802 | 20.1 | 617.7 | 11.23 | 15.14 |

Figure 1:
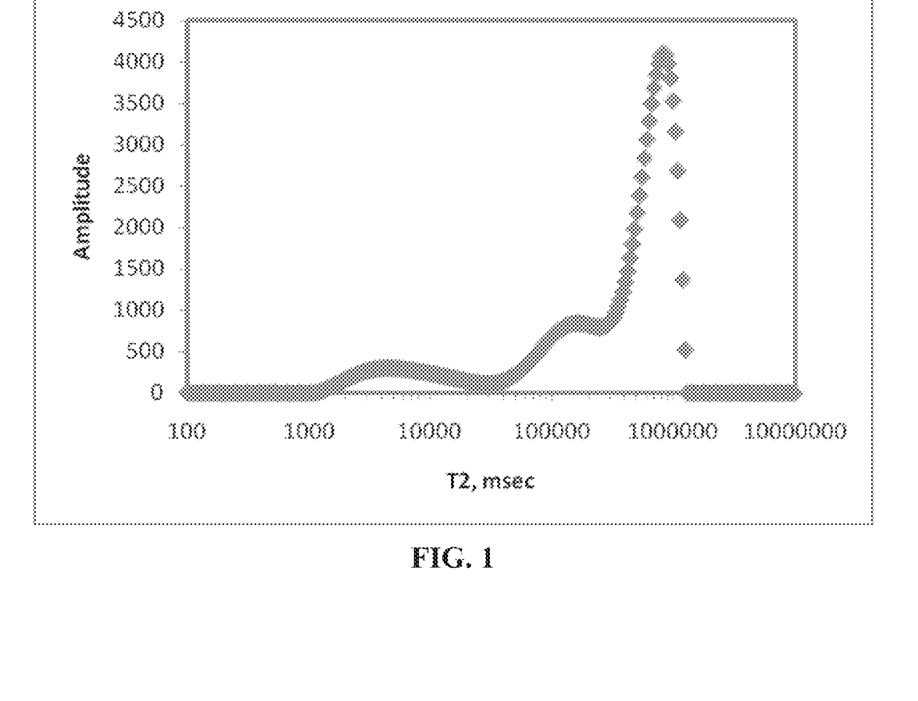
FIGS. 1-6 shows data collected from experiments in accordance with one or more embodiments of the present invention.

FIG. 1 illustrates a T2 distribution for a permeable carbonate rock characterized by a bimodal pore size distribution. The initial two peaks from the left side represent micropore size distribution and the larger peak on the right side represents macropore size distribution.

Brines

Two brines were used in the coreflooding study including (1) field connate water to establish initial or irreducible water saturation (Swi) for composite cores and (2) two salinity slugs of seawater as injected waters to displace oil out of cores. All brines were prepared from distilled water and reagent grade chemicals based on a geochemical analysis of field water samples. Seawater has a salinity of 57,600 ppm, and formation water has a salinity of 213,000 ppm.

Crude Oil

Reservoir oil samples were collected from the same carbonate reservoirs as the core materials. Crude oil filtration was conducted to remove solids and contaminants to reduce any experimental deviations during the coreflood experiments. In this coreflood experiment, dead oil was used, where the total acid number and other oil properties are listed below in Table II.

TABLE II

Reservoir Oil Properties for Collected oil Samples

| Component | Amount |
|---|---|
| Saturates, % | 40.57 |
| Aromatics, % | 51.75 |
| Resins, % | 5.55 |
| Asphaltenes, % | 2.03 |
| Total Acid Number, mg KOH/g oil | 0.05 |

Core Plug Preparation

The pore volume of cores, original oil in place, and connate water saturation of selected composite core plugs were determined using a Centrifuge apparatus. The procedure for preparing each core is as follows:
1) Dry weight is measured.
2) Core plug is saturated under vacuum for 5-7 days with field connate water to achieve ionic equilibrium with the core samples.
3) Wet weight is measured.
4) Pore volume is determined by weight difference and the density of field connate water at room temperature.
5) Each core plug is centrifuged at 5000 rpm for 12 hrs to drain the water in the pores and establish the initial water saturation.
6) Weight of centrifuged core sample is measured.
7) The original oil in place (OOIP) and initial water saturation are determined by weight difference—prior and post centrifuge—and the density of field connate water.

Figure 2:
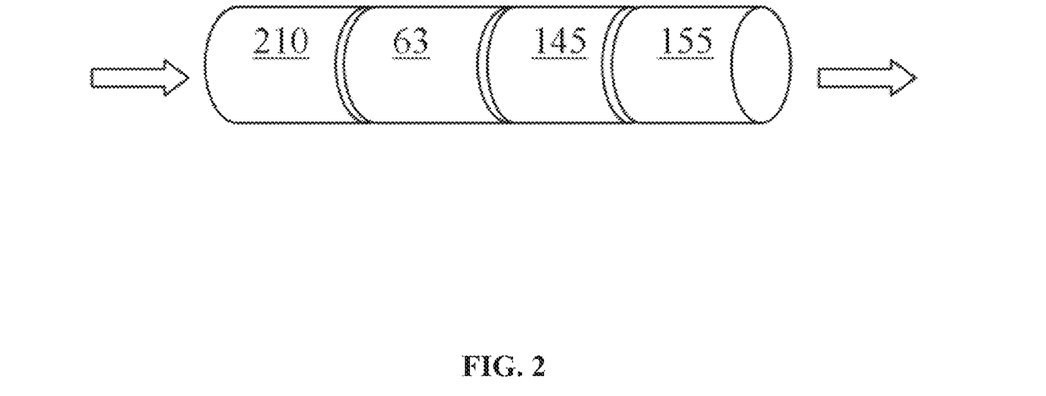

Table III shows the pore volume calculation results obtained using a centrifuge method with the initial water saturation for the core plugs used in the coreflood experiment. The total pore volume for the composite core was 37.82 cc, and the original oil in place (OOIP) was 31.79 cc. The average initial water saturation for the composite was 16%. The position of each core plug in the composite sample is ordered by a harmonic arrangement as illustrated in FIG. 2.

TABLE III

Pore Volume Determination and Swi % Results for Coreflooding Test

| Sample # | Dry wt, g | Wet wt, g | Liquid wt, g | Pore Volume, cc | Wet wt after 5000 RPM for Hrs, g | Wet wt diff., g | $S_{wi}$, % |
|---|---|---|---|---|---|---|---|
| 63 | 81.904 | 92.790 | 10.886 | 9.51 | 83.84 | 8.95 | 17.78 |
| 146 | 78.558 | 88.740 | 10.182 | 8.89 | 79.88 | 8.86 | 12.98 |
| 155 | 95.693 | 105.070 | 9.377 | 8.19 | 97.39 | 7.68 | 18.10 |
| 210 | 100.924 | 113.780 | 12.856 | 11.23 | 102.87 | 10.91 | 15.14 |
| Sum | | | | 37.82 | | | 16.00 |

Chemicals

Figure 4:
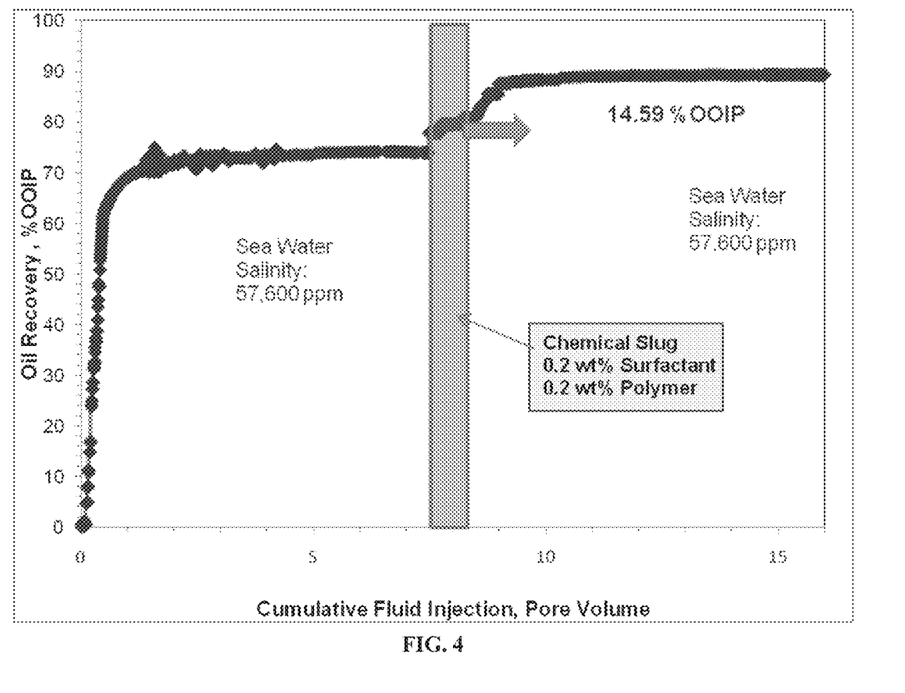
Figures 5, 6:
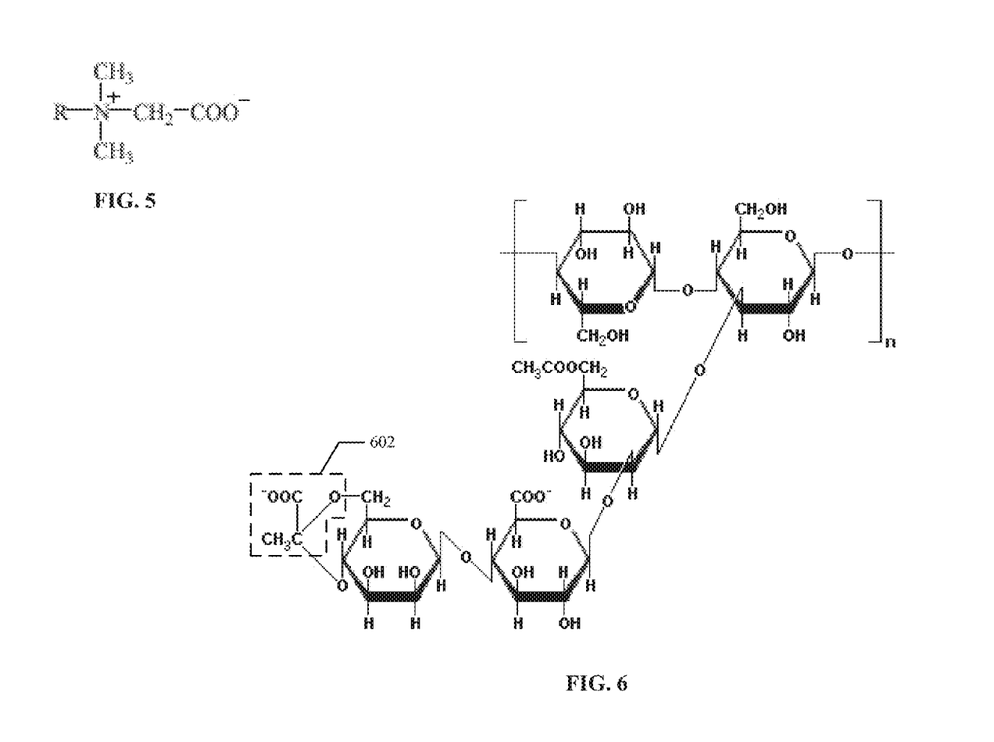

In one embodiment, the saline soluble surfactant used in the surfactant/polymer mixture (i.e., chemical slug used as shown in FIG. 4) is a betaine type surfactant with a concentration range from 0.1 weight percent (wt %) to 0.5 wt % (preferably about 0.2 wt %). For example, an amphoteric surfactant such as a betaine type surfactant may be used in the mixture, where the betaine type surfactant is used with an ethylene glycol mono butyl ether as a co-surfactant, which is specially designed for high salinity environments. An example chemical structure for a betaine type surfactant is shown in FIG. 5. In another example, sulfonated betaine or carboxylated betaine may be used in the mixture. Further, the amount described herein refers to active surfactant material in the commercial product, which also contains water and 50 wt % of active material.

In one embodiment, the saline soluble polymer used in the surfactant/polymer mixture is sulfonated polyacrylamides with a concentration range from 0.1 wt % to 0.3 wt % (preferably about 0.2 wt %) or xanthan gum without a pyruvylate group and a concentration range from 0.1 wt % to 0.3 wt% (preferably about 0.2 wt %). For example, the surfactant/polymer mixture can include a copolymer of acrylamide and acrylamide tert-butyl sulfonate with a sulfonation degree of 25%, a molecular weight of 10×10⁶ Daltons, hydrolysis degree of 25%, and effective solid content of 88%. In another example, the surfactant/polymer mixture can include a sulfonated polymer with a sulfonation degree from 5% to 32%. In yet another example, the regular repeat structure of the biopolymer xanthan is shown in FIG. 6 with a pyruvylate group (602), where the surfactant/polymer mixture can include the biopolymer xanthan without the pyruvylate group (602).

In one embodiment, the surfactant/polymer mixture has an absence of alkali.

In one embodiment, an interfacial tension (IFT) between the surfactant/polymer mixture and crude oil of the carbonate reservoir is defined to be in a range of $10^{-2} \sim 10^{-3}$ dynes/centimeter under reservoir temperature. For example, a solution was prepared at a concentration of 0.2 wt % in seawater, where the density was 1.008 g/cm$^3$ and the viscosity was 4.13 cP at 100° C. In this example, the IFT between crude oil and seawater was 0.0021 dynes/cm. Table IV below shows the density of the surfactant/polymer mixture under various temperatures.

TABLE IV

Density of Surfactant/Polymer Mixture

| Temperature, ° C. | Solution Density, g/cm$^3$ | Dead Oil Density, g/cm$^3$ |
|---|---|---|
| 20 | 1.0407 | 0.871 |
| 25 | 1.0391 | 0.868 |
| 40 | 1.0332 | 0.857 |
| 75 | 1.0184 | 0.833 |
| 90 | 1.0124 | 0.822 |
| 100 | 1.0084 | 0.814 |

Table V shows the viscosity of surfactant/polymer mixture under various temperatures.

TABLE V

Viscosity of Surfactant/Polymer Mixture

| Temperature, ° C. | Solution Viscosity, cP | Dead Oil Viscosity, cP |
|---|---|---|
| 25 | 14.0 | 9.40 |
| 40 | 10.3 | 6.10 |
| 60 | 7.41 | 4.39 |
| 90 | 4.72 | 2.84 |
| 100 | 4.13 | 2.27 |

Figure 3:
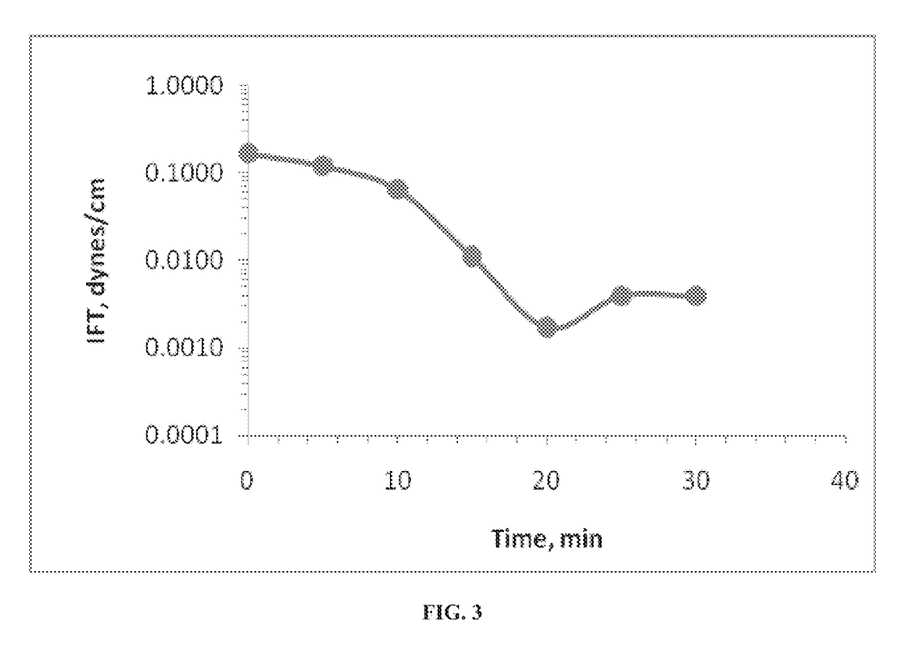

In view of the testing performed above, the surfactant/polymer mixture is compatible with sea water, and phase behavior was exhibited when the mixture was exposed to crude oil at 95° C. Specifically, FIG. 3 shows the interfacial tension between Crude Oil and the surfactant/polymer mixture at 95° C.

Displacement Test

The coreflooding apparatus engaged in the aforementioned studies was custom-designed to perform experiments with composite core plugs to evaluate oil recovery using waterflooding or any other type of injectants at reservoir conditions. The main components of the coreflooding apparatus are an oven, a stainless steel core holder, fluids accumulators, a differential pressure array, one Quizix pump, a back pressure regulator (BPR), and a confining pressure module.

The experimental procedure for using the coreflooding apparatus is as follows:
1) Each plug used in a composite was saturated with connate water by introducing degassed brine into an evacuated vessel containing the dry plugs.
2) After obtaining saturated weights, the plugs were centrifuged to connate water saturation, $S_{wi}$, followed by dead oil flush.
3) The core plugs were aged in crude oil for at least 4 weeks. The composite is now a proper replication of the carbonate reservoir in terms of fluid saturations, reservoir temperature and pressure, as well as wettability status.
4) In the coreflooding experiments, seawater flooding was conducted while monitoring the amount of oil produced, pressure drop across the composite, and injection rate.

The following is the injection procedure used in step (4) of the experimental procedure above:

Seawater is injected at a constant rate of 1 cc/min

Oil is produced and collected in the separator under reservoir conditions.

Seawater flooding is continued until no additional oil is produced--the water cut reaches 99% (usually 3-5 pore volumes of brine)

Seawater flooding continued up to 8 pore volumes of composite cores to ensure that all mobile oil was produced.

Optionally, another practice may be implemented to further ensure that mobile oil was produced by first raising the injection rate to 2 cc/min and then to 4 cc/min. The injection rate may then be dropped back to 1 cc/min at the end of this phase of the injection procedure. This optional practice may necessitate another 2 pore volumes.

The oil recovery curve is depicted in FIG. 4. The oil recovery by seawater flooding is approximately 69.3% in terms of original oil in place (OOIP). The oil recovery by seawater flooding targets mobile oil in the cores and represents the secondary oil recovery. The additional oil recovery, via tertiary recovery by surfactant in twice diluted seawater, was 14.59% of OOIP. Thus, in this example, the total incremental oil recovery beyond conventional waterflooding, is 89.8% by this injection process. FIG. 4 indicates significant tertiary oil recovery can be achieved by injection of the slug of the dilute surfactant solution as described above.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed.

We claim:

1. A composition for recovering hydrocarbons in a carbonate reservoir, the composition comprising:
   a saline solution with a salt concentration ranging from 35,000 ppm to 80,000 ppm;
   a betaine surfactant with a concentration range from 0.1 weight percent to 0.5 weight percent; and
   a saline soluble polymer with a concentration range from 0.1 weight percent to 0.3 weight percent and containing xanthan gum without a pyruvylate group, wherein the composition has a density of 1.008 g/cm$^3$ and a viscosity of 4.13 centipoise at 95° C.

2. The composition as claimed in claim 1, wherein the betaine surfactant is sulfonated betaine, or carboxylated betaine.

3. The composition as claimed in claim 1, wherein the betaine surfactant is carboxylated betaine with ethylene glycol mono butyl ether as a co-surfactant.

4. The composition as claimed in claim 1, wherein the betaine surfactant has a concentration of 0.2 percent.

5. The composition as claimed in claim 1, wherein an interfacial tension between the composition and crude oil of the carbonate reservoir is in a range of $10^{-2}$ to $10^{-3}$ dynes/centimeter under reservoir temperature.

6. The composition as claimed in claim 1, wherein adsorption of reservoir rock of the composition is 1.0 grams/kilogram to 1.5 grams/kilogram when exposed to harsh temperature and salinity conditions of the carbonate reservoir.

7. The composition as claimed in claim 1, wherein the composition has an absence of alkali.

* * * * *